(12) United States Patent
Widows

(10) Patent No.: US 12,498,140 B2
(45) Date of Patent: Dec. 16, 2025

(54) MULTI-TANK STORAGE TYPE GAS WATER HEATER

(71) Applicant: Stanley Ray Widows, Cicero, IN (US)

(72) Inventor: Stanley Ray Widows, Cicero, IN (US)

( * ) Notice: Subject to any disclaimer, the term of this patent is extended or adjusted under 35 U.S.C. 154(b) by 99 days.

(21) Appl. No.: 18/216,353

(22) Filed: Jun. 29, 2023

(65) Prior Publication Data

US 2025/0003635 A1    Jan. 2, 2025

(51) Int. Cl.
*F24H 1/18*    (2022.01)
*F24H 1/20*    (2022.01)
*F24H 9/00*    (2022.01)

(52) U.S. Cl.
CPC ............ *F24H 1/186* (2013.01); *F24H 1/181* (2013.01); *F24H 1/206* (2013.01); *F24H 9/0021* (2013.01)

(58) Field of Classification Search
CPC . F24H 1/205; F24H 1/206; F24H 1/28; F24H 1/287; F24H 1/46; F24H 9/0026; F24H 9/0031
See application file for complete search history.

(56) References Cited

U.S. PATENT DOCUMENTS

| | | | |
|---|---|---|---|
| 4,222,350 A | 9/1980 | Pompei et al. | |
| 4,253,446 A | 3/1981 | Müller | |
| 4,403,572 A | 9/1983 | Gerstmann et al. | |
| 4,598,694 A | 7/1986 | Cromer | |
| 4,676,199 A * | 6/1987 | Daugirda | F24H 8/006 122/18.31 |
| 5,027,749 A * | 7/1991 | Cifaldi | F24H 1/205 122/18.31 |
| 5,355,841 A * | 10/1994 | Moore, Jr. | F24H 9/1836 122/18.31 |
| 5,537,955 A * | 7/1996 | Wu | F24H 1/124 122/18.1 |
| 6,553,947 B2 | 4/2003 | Bradenbaugh | |
| 2001/0003274 A1* | 6/2001 | Overbey, Jr. | F24H 9/1836 122/13.01 |
| 2004/0079749 A1* | 4/2004 | Young | F24H 15/407 219/486 |
| 2004/0234255 A1 | 11/2004 | Yui | |

(Continued)

FOREIGN PATENT DOCUMENTS

EP    2489954 A2    8/2012

*Primary Examiner* — Steven S Anderson, II
(74) *Attorney, Agent, or Firm* — Bruce J. Bowman

(57) ABSTRACT

A storage type gas water heater has two or more tanks providing a primary heated water storage tank from which hot water is drawn, and one or more supplementary water storage tanks that utilize hot combustion gas from the primary heated water storage tank to generate and supply temperate water to previous supplementary water storage tanks and/or the primary water storage tank. A diffuser chamber is provided between the primary heated water storage water tank and the supplementary water storage tank with combustion gas from the primary heated water storage tank vented therein. A diffuser is provided in the diffuser chamber to disperse the vented combustion gas to pre-heat (temperate) the water in the supplementary water storage tank. If more than one supplementary water storage tank is provided, each supplementary water storage tank is separated by a diffuser in a diffuser chamber with combustion gas vented therein.

12 Claims, 3 Drawing Sheets

(56) References Cited

U.S. PATENT DOCUMENTS

| | | | |
|---|---|---|---|
| 2008/0085106 A1* | 4/2008 | Jenson | F24H 1/165 |
| | | | 392/490 |
| 2010/0290763 A1* | 11/2010 | Boulay | F24H 15/164 |
| | | | 219/494 |
| 2018/0372374 A1* | 12/2018 | Bailey | F24H 1/205 |
| 2022/0082296 A1 | 3/2022 | Satyanarayana et al. | |

\* cited by examiner

MULTI-TANK STORAGE TYPE GAS WATER HEATER

FIELD OF THE INVENTION

The present invention relates to storage type gas water heaters and, more particularly, to multi-tank storage type gas water heaters.

BACKGROUND OF THE INVENTION

Typical storage type gas water heaters include a storage tank configured to receive unheated water via a cold water inlet by a tube to the bottom of the tank and output heated water from a hot water outlet at the top of the tank. A radial flame gas burner is disposed at the bottom of the tank for heating the water contained in the bottom tank. A centrally located gas flue extends vertically through and out of the water tank discharged as hot combustion gas created by the burning gas as exhaust. Typically, all of the water within the storage tank must be heated from a cold water from anywhere from 37 F to 67 F for most of the continental United States to a standard acceptable set temperature from a range of about 120° to 140° F. before a user may output heated water. The heated water is stored in the water tank until there is a demand. As a result, the heating process can often be time-consuming and inefficient, particularly when the storage tank is relatively large in volume.

Additional heat may be transferred to the water in the water tank from hot combustion gas passing upward through the gas flue. Flue baffles may be employed in the gas flue for improving heat transfer from the combustion gas to the water in the water tank.

Further, as the storage tank outputs heated water, the storage tank can simultaneously or subsequently receive unheated water in order to meet the demand for heated water. When the unheated water flows into the storage tank, the overall temperature of water within the storage tank can be significantly reduced. Once the temperature of water within the storage tank is reduced due to the influx of unheated water, the water must be heated to achieve the desired set temperature, thereby requiring the need to expend additional energy to provide additional water at the desired temperature. Once achieving that temperature but not having any current demand the unit must continually cycle the burner to maintain the set temperature reducing efficiency of the gas water heater.

In view of the inefficiencies of typical storage type gas water heaters it would therefore be advantageous to have a storage type gas water heater that can heat volumes of water to a set temperature in increments. It would be further advantageous to have a storage type gas water heater with multiple tanks of water in different stages of being heated. It would be still further advantageous to have a storage type gas water heater with separate tanks that temperate water from combustion gas and supply the temperate water to a previously heated water tank. It would be even further advantageous to have a storage type gas water heater with a primary water storage tank for heating water to a set temperature with one or more supplementary water storage tanks that each provide temperate water from combustion gas of the primary water storage tank and supplies the temperate water to the primary water storage tank or a previous secondary water storage tank.

The present storage type gas water heater addresses the above and more.

SUMMARY OF THE INVENTION

A storage type gas water heater has a housing, a primary water storage tank within the housing and configured to accept temperate water from a supplementary or secondary water tank vertically disposed relative to the primary water storage tank that receives cold water inputted therein external to the housing via a cold water inlet, and heat the received temperate water to a preset temperature via a gas burner situated in a gas combustion chamber of the housing disposed vertically below the primary water storage tank for outputting the heated water from the housing via a hot water outlet, the storage type gas water heater having a diffuser chamber in the housing between the primary water storage tank and the supplementary water storage tank with a first gas flue portion extending vertically from the gas combustion chamber through the primary water storage tank and into the diffuser chamber for directing combustion gas from the gas combustion chamber into the diffuser chamber, the diffuser chamber having a diffuser situated vertically above the first gas flue portion for allowing the combustion gas to impinge on the diffuser to heat the diffuser, chamber and bottom of the secondary tank helping to temperate the cold water in the supplementary water storage tank, and a second gas flue portion extending vertically from the diffuser chamber vertically above the diffuser, through the supplementary water storage tank and out the housing.

The diffuser is preferably, but not necessarily, free standing in a fixed position in the diffuser chamber via a plurality of legs or other mechanical structure. In one form, the diffuser is comprised of a dome-shaped metal. In another form, the diffuser is comprised of a disc-shaped metal. In yet another form, the diffuser is comprised of a dish-shaped metal. The design and makeup of the diffuser would be specific to the exhaust flow rate desired to extract as much energy as possible before exiting through the flue.

The storage type gas water heater also has a gas inlet connected to the gas burner, an ignitor for igniting the gas burner, and a thermostat for setting a water temperature of the water in the primary water storage tank and a high pressure relief valve to meet safety requirements for pressurized vessels. The storage type gas water heater further has an air intake in communication with the gas combustion chamber for allowing ambient air to enter the gas combustion chamber.

The storage type gas water heater may have a second supplementary or tertiary water storage tank situated vertically above the supplementary water storage tank that receives inputted cold water rather than the supplementary water storage tank and which provides temperate water to the supplementary water storage tank, with a second diffuser chamber between the supplementary water storage tank and the second supplementary water storage tank, with the second gas flue portion extending vertically into the second diffuser chamber for directing combustion gas from the diffuser chamber into the second diffuser chamber, the second chamber having a second situated vertically above the second gas flue portion for allowing the combustion gas to impinge on the second diffuser to heat the second diffuser and temperate the cold water in the second supplementary water storage tank, and a third gas flue portion extending vertically from the second diffuser chamber vertically above the second diffuser, through the second supplementary water storage tank and out the housing.

Depending on the amount of hot water required and desired amount level of efficiency the number of tempering tanks, which would all have energy recovery diffuser chamber, could be extended to however many were required so the example of 3 could be a starting point not maximum.

The storage type gas water heater may have more than three water storage tanks, with a diffuser chamber and diffuser situated between each vertically successive water storage tank, and additional flue portions in like manner to the three-water tank storage form. Cold water would be inputted to the uppermost water storage tank with temperate water from an upper water storage tank being supplied to an immediately adjacent lower water storage tank. Hot water would be output from the primary water storage tank in a similar manner to the two and three water storage tank forms.

Further aspects of the present invention will become apparent from consideration of the drawings and the following description of the invention. A person skilled in the art will realize that other forms of the invention are possible and that the details of the invention can be modified in a number of respects without departing from the inventive concept. The following drawings and description are to be regarded as illustrative in nature and not restrictive.

BRIEF DESCRIPTION OF THE DRAWINGS

The present invention and its features will be better understood by reference to the accompanying drawings, wherein.

Figure 1:
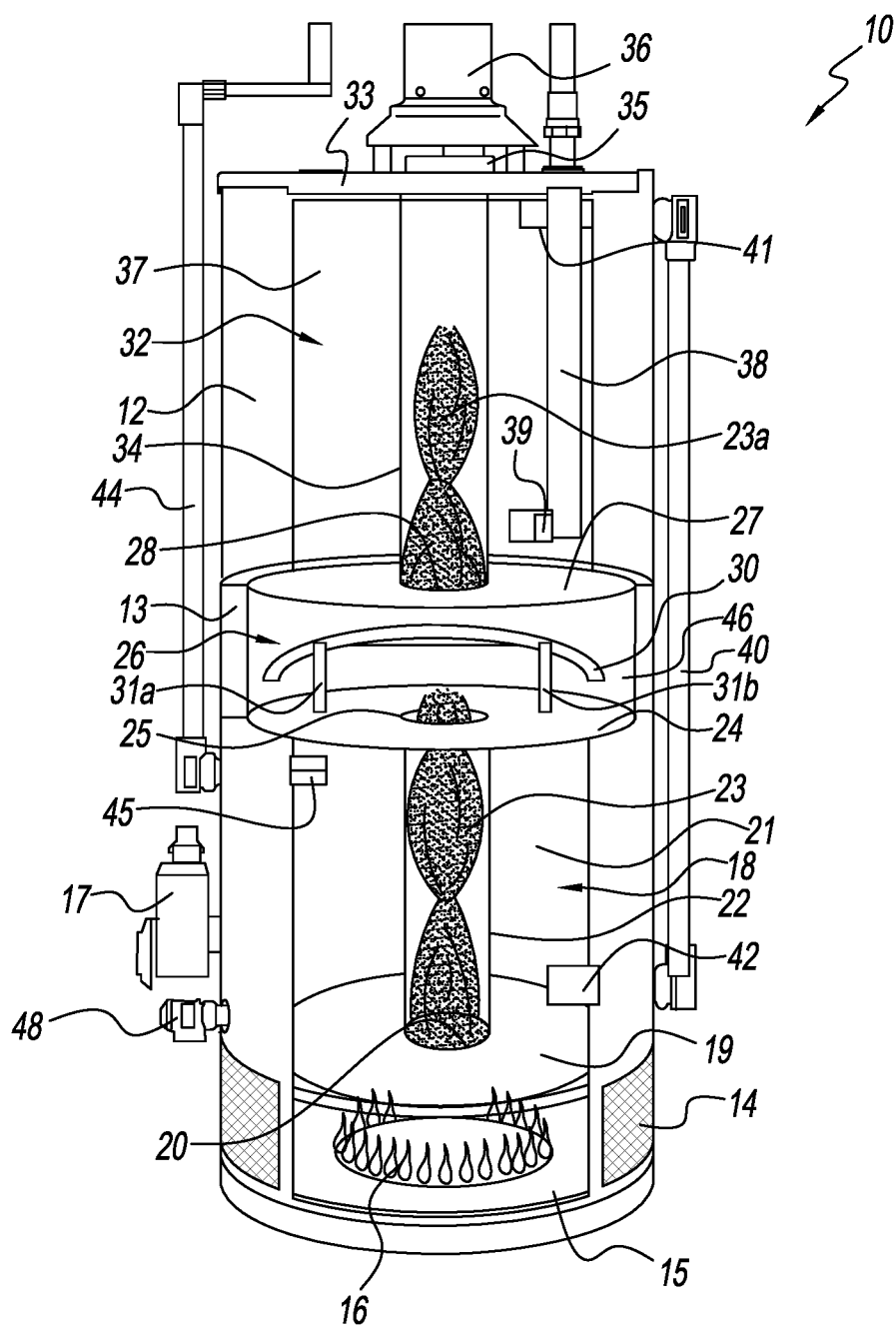
FIG. 1 is a partial sectional view of an exemplary embodiment of a multi-tank storage type gas water heater fashioned in accordance with the present principles.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

DETAILED DESCRIPTION OF THE INVENTION

Referring to FIG. 1, there is shown an exemplary embodiment of a multi-tank storage type gas water heater generally designated 10. The multi-tank storage type gas water heater 10 has a housing 12 in the general shape of a cylinder, however, the housing 12 may be shaped differently depending on desirability and/or function. The housing 12 is preferably, but not necessarily, made of metal and is hollow. Insulation 13 is provided along its inner cylindrical wall. The size of the housing 12 depends on its water storage capacity and thus may be made in various sizes.

The housing 12 encloses a lower chamber or compartment 15 fashioned as a gas combustion chamber with a radial gas burner 16 therein. Other styles of gas burners may be used and are contemplated. The radial gas burner 16 is connected to a gas valve and thermostat 17 for the water heater 10 and situated on the outside of the housing 12, the gas valve and thermostat 17 being connectable to a gas supply line (not shown). The housing 12 also includes one or more vents or air intakes 14 for allowing air into the combustion chamber 15. Vertically above the combustion chamber 15 is a water storage tank or chamber 18 divided from the combustion chamber 15 via a top wall or partition 19 that is also a bottom wall or partition 19 of the water storage tank 18. The water storage tank 18 may be considered a lower water storage tank, a primary water storage tank, or a first water storage tank with the nomenclature "first" being arbitrary. The primary water storage tank 18 also has a top wall or partition 24. The primary water storage tank 18 may be sized as desired to hold an amount of water. The wall/divider 19 is preferably, but not necessarily, made of metal, but may be made from another material that allows thermal transfer of heat generated from the gas burner 16 to water in the primary water storage tank.

The valve/thermostat 17 allows for setting a temperature for the water in the primary water storage tank. The primary water storage tank 18 is thus the hot water storage tank from which hot water is drawn. An outlet 45 is thus provided at a top section of the primary water storage tank 18 that is in communication with the primary water storage tank 18 and a hot water outlet tube 44 for dispensing/outputting hot water from the primary water storage tank 18 and thus the water heater 10. While the hot water outlet tube 44 is shown external to the housing 12, the hot water outlet tube may be internal to the housing 12 with an outlet thereof extending from the housing 12. The hot water tube/outlet 44 is connectable to a hot water supply conduit (not shown) to provide hot water to where it is needed.

The partition 19 has a hole or cutout 20 that is preferably, but not necessarily, situated in the center of the partition 19. A first flue portion or tube 22 extends from the hole 20 to a hole or cutout 25 of the partition 24 to allow hot combustion gas or exhaust 23 from the burning of gas (or other combustible fuel) from the gas burner 16. Situated above the primary water storage tank 18 is a diffuser chamber or hot exhaust gas recovery chamber 26. The top or partition 24 of the primary water storage tank 18 defines/is the bottom or partition of the diffuser chamber 26. The first flue portion 22 allows the combustion gas 23 to flow into the diffuser chamber 26. A diffuser or baffle 30 is situated in the diffuser chamber 26. The diffuser 30 is situated over the outlet of the first flue portion 22 such that the hot combustion gas 23 flows or impinges onto the underside of the diffuser 30 and is redirected to the top 27 of the diffuser chamber 26 to heat the top 27 of the diffuser chamber 26. The diffuser 30 is preferably, but not necessarily, made of metal such that the diffuser 30 is heated by the hot combustion gas 23, as well as radiating acquired heat. Other materials may be used. The diffuser 30 is shown as dome or bell shaped with an air gap about its sides. Other shapes may be used and are contemplated. The diffuser 30 is supported on/by legs or supports 31a, 31b, 31c, 31d. The diffuser chamber 26 is also defined by the upper/top wall or partition 27, which also forms/defines a bottom of a second or supplementary water storage tank 32, the nomenclature second being arbitrary. The partition 27 has a hole or cutout 28 that is preferably, but not necessarily, situated in the center of the partition 27. A second flue portion or tube 34 extends from the hole 28 to an outlet 35 at the top of the housing 12 to allow hot combustion gas 23*a* from the diffuser chamber 26 to be vented from the housing 12/water heater 10. A powered or unpowered vent hood 36 is provided over the flue portion outlet to allow the hot combustion gas/exhaust 23*a* to escape from the housing 12/water heater 10.

The supplementary water storage tank 32 has a top 33 that may be the top of the housing 12 such that the supplementary water storage tank 32 can hold a volume of water. A cold water inlet 39 connected to a cold water supply pipe extends into a lower section of the supplementary water storage tank 32 for supplying cold water to the supplementary water storage tank 32. The cold water in the supplementary water storage tank 32 is warmed or tempered by the hot combustion gas 23 in the diffuser chamber 26 through radiant heat of the diffuser 30 and the redirection of the hot combustion gas 23 to the bottom 27 of the supplementary water storage tank in order to create temperate water in the supplementary water storage tank 32.

An outlet 41 is provided at a top section of the supplementary water storage tank 32 that is connected via piping to an outlet 42 situated at a lower section of the primary water storage tank 18 to provide temperate water from the supplementary water storage tank 32 to the primary water storage tank 18. The temperate water is mixed with the hot water of the primary water storage tank 18 and heated. While the temperate water outlet tube is shown external to the housing 12, the temperate water outlet tube may be internal to the housing 12. The water heater 10 also includes a pressure relief valve 48 extending from the housing 12 and in communication with the interior of the primary water storage tank 18 for relieving any excess water pressure within the primary water storage tank 18.

Figure 2:
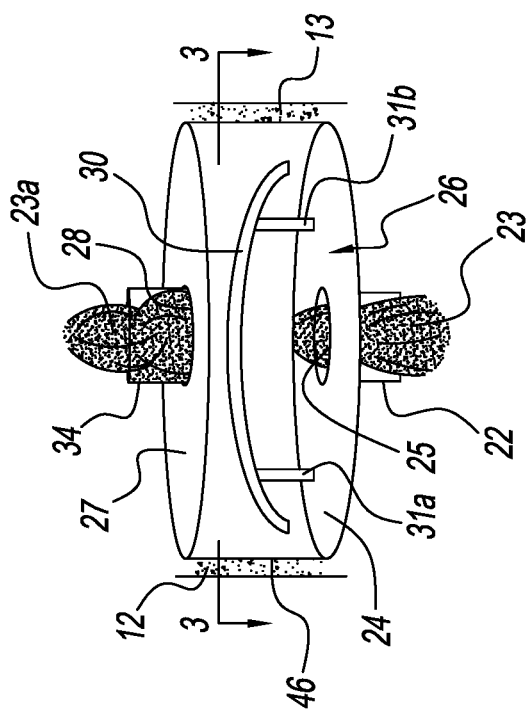
FIG. 2 is an enlarged sectional view of the diffuser chamber of the exemplary multi-tank storage type gas water heater of FIG. 1.

FIG. 2 depicts a perspective view of the diffuser/hot combustion gas energy recovery chamber 26 (diffuser chamber 26). The diffuser chamber 26 is essentially cylindrical, made from an appropriate metal or other similar material, and preferably, but not necessarily, follows the shape of the housing 12, thereby having a cylindrical wall 46. The diffuser chamber 26 may take other shapes as desired. Insulation 13 is preferably, but not necessarily, situated between the outer surface of the cylindrical wall 46 and the inner wall of the housing 12 as long as the exterior of the water heater skin, in or around the diffuser chambers are cool enough to meet safety standards for hot surfaces. The bottom 24 of the diffuser chamber is generally round having a generally round opening 25 preferably, but not necessarily situated in the center of the bottom 24. The first flue portion 22 extends to and/or into the opening 25. Combustion gas 23 is shown within the first flue portion 22 and entering the diffuser chamber 26. The top 27 of the diffuser chamber 26 is generally round having a generally round opening 28 preferably, but not necessarily situated in the center of the top 28. The second flue portion 34 extends from the opening 28. Combustion gas 23*a* is shown within the second flue portion 22 and exiting therefrom.

The diffuser 30 is made of metal or other material capable of being heated and able to radiate acquired heat. Cost and/or efficiency goals are contemplated. The diffuser 30 is generally dome-shaped and is supported by a plurality of legs 31*a*, 31*b*, 31*c* (not seen in FIG. 2), and 31*d* (not seen in FIG. 2). The first flue portion 22 is situated such that the hot combustion gas 23 from the gas combustion chamber enters the diffusion chamber 26 and impinges on the diffuser 30. This reroutes the hot exhaust (combustion) gas to heat the diffusion chamber 26 and the diffuser 30. In so doing, the heated diffusion chamber 26 and the diffuser 30 heats the top 27 of the diffuser chamber 26, which is also the bottom of the supplementary water storage tank 32 (see FIG. 1). This tempers the cold water in the supplementary water storage tank 32 to provide temperate water to the primary water storage tank 18.

Figure 3:
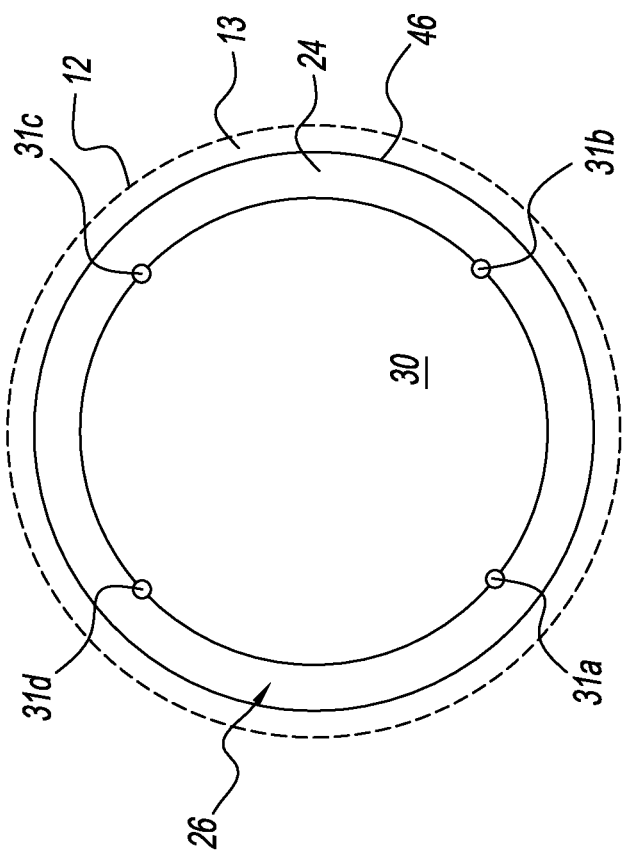
FIG. 3 is a top plan view of the diffuser chamber taken along line 3-3 of FIG. 2.

FIG. 3 depicts a top plan view of the diffuser 30 within the diffuser chamber 26 taken along line 3-3 of FIG. 2. The cylindrical wall 12 of the housing is shown in dashed line. Insulation 13 is between the inner surface of the housing 12 and the outer surface of the diffuser chamber wall 46. The diffuser 30 is shown supported on the four support legs 31*a*, 31*b*, 31*c*, 31*d*. The number, locations, and design of whatever is holding the diffuser in position will be dictated by what is the most cost effective way to achieve stability for the diffuser for the life of the water heater. The bottom 24 of the diffusion chamber 26 is shown. The space between the end side of the diffuser 30 and the outer wall 46 of the diffuser chamber 26 provides an air passage. The air passage spacing, and flue portion size, will be dictated by air volume needed to support proper combustion for gas burner BTU output. The spacing between the outer wall 46 of the diffuser chamber 26 and the wall of the housing 12 will be dictated by desired insulative value outside wall temperature safety.

Figure 4:
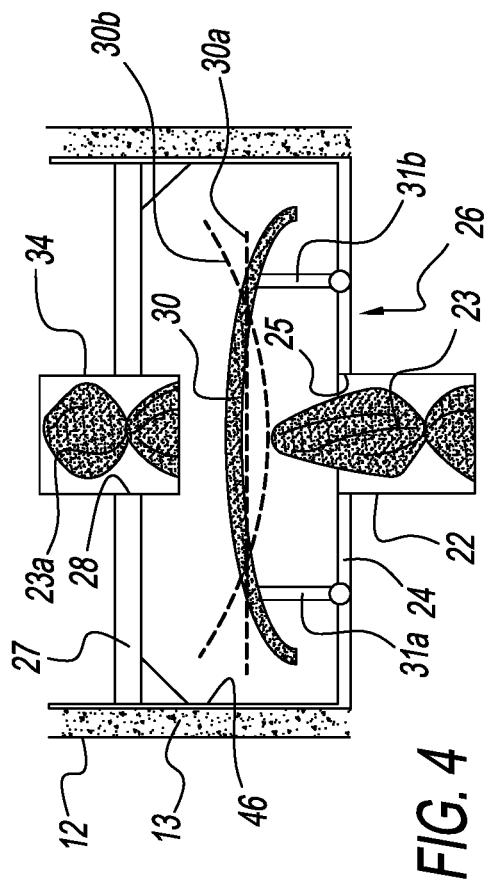
FIG. 4 is a sectional view of the diffuser chamber of FIG. 1 showing the inlet flue and the outlet flue illustrating several styles of diffusers.

FIG. 4 depicts a sectional side view of the diffuser chamber 26 within the housing illustrating several types of diffusers 30, 30*a*, 30*b* that may be used in the diffuser chamber 26. The diffuser 30 of the multi-tank storage type gas water heater 10 is shown supported on the legs 31*a*, 31*b* seen in FIG. 4. An alternate style of diffuser 30*a* is depicted in dashed line that is generally disc-shaped and flat. Another alternate style of diffuser 30*b* is depicted in dashed line that is generally dome-shaped. Both alternate diffusers 30*a*, 30*b* are metal or other material capable of being heated and able to radiate acquired heat. Other shapes may be used and are contemplated. Design and shape may be driven by an overall balance of being able to extract thermal energy while not impeding or restricting the combustion gas exhaust flow. Also, while the first diffusion chamber may have the dome or bell-shaped diffuser 30, subsequent diffuser chambers (as in FIG. 5) may need a less restrictive design.

Figure 5:
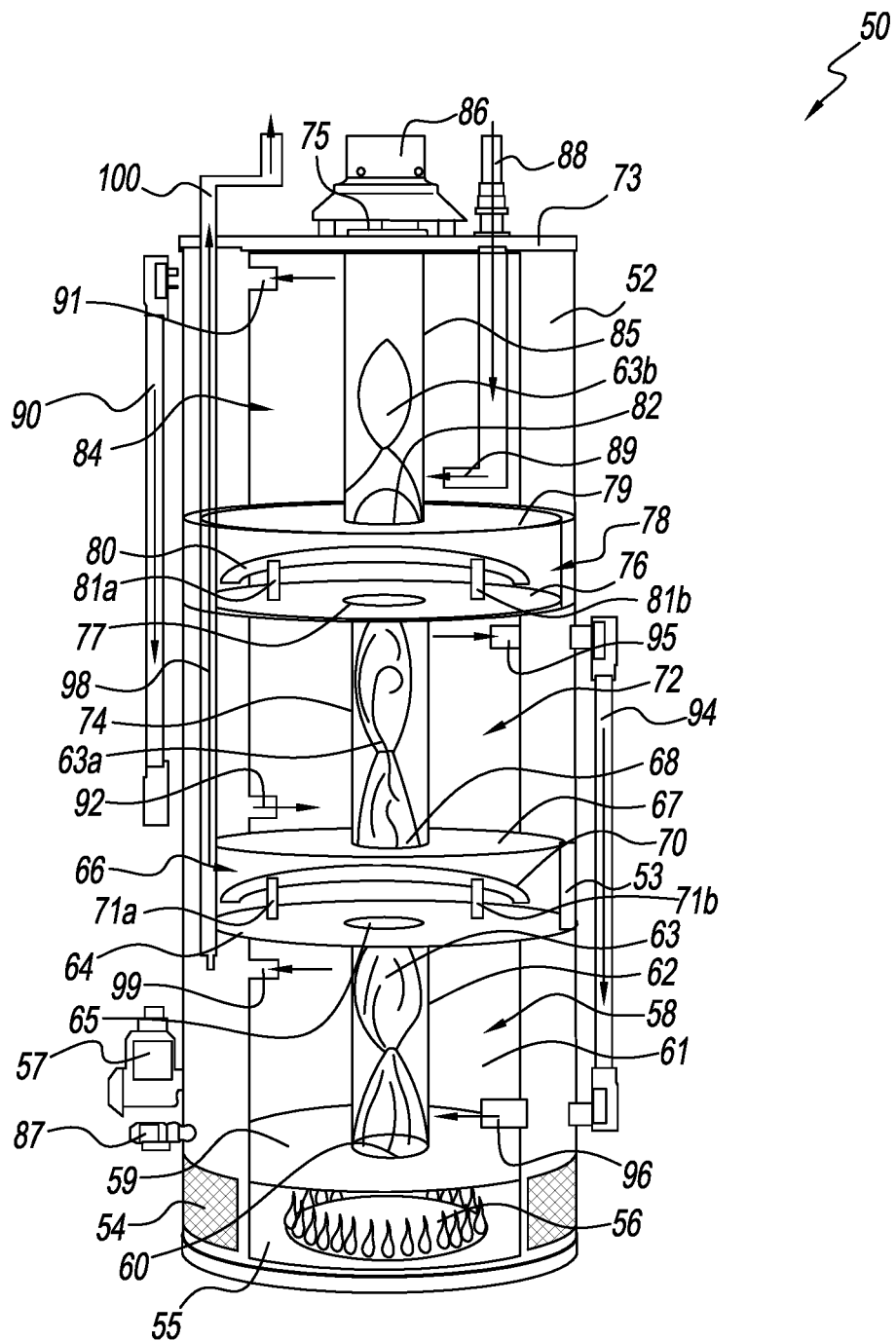
FIG. 5 is a sectional view of another exemplary embodiment of a multi-tank storage type gas water heater fashioned in accordance with the principles of the present invention.

Referring to FIG. 5, there is shown another exemplary embodiment of a multi-tank storage type gas water heater generally designated 50. The multi-tank storage type gas water heater 50 has a housing 52 in the general shape of a cylinder, however, the housing 52 may be shaped differently depending on desirability and/or function. The housing 52 is preferably, but not necessarily, made of metal and is hollow. Insulation 53 is provided along its inner cylindrical wall. The size of the housing 52 depends on its water storage capacity and thus may be made in various sizes.

The housing 52 encloses a lower chamber or compartment 55 fashioned as a gas combustion chamber with a radial gas burner 56 therein. Other styles of gas burners may be used and are contemplated. The radial gas burner 56 is connected to a gas valve and thermostat 57 for the water heater 50 and situated on the outside of the housing 52, the gas valve and thermostat 57 being connectable to a gas supply line (not shown). The housing 52 also includes one or more vents or air intakes 54 for allowing air into the combustion chamber 55. Vertically above the combustion chamber 55 is a water storage tank or chamber 58 divided from the combustion chamber 55 via a top wall or partition 59 that is also a bottom wall or partition 59 of the water storage tank 58. The water storage tank 58 may be considered a lower water storage tank, a primary water storage tank, or a first water storage tank with the nomenclature "first" being arbitrary. The primary water storage tank 58 also has a top wall or partition 64. The primary water storage tank 58 may be sized as desired to hold an amount of water. The wall/divider 59 is preferably, but not necessarily, made of metal, but may be made from another material that allows thermal transfer of heat generated from the gas burner 56 to water in the primary water storage tank.

The valve/thermostat 57 allows for setting a temperature for the water in the primary water storage tank. The primary water storage tank 58 is thus the hot water storage tank from which hot water is drawn. An outlet 99 is thus provided at a top section of the primary water storage tank 58 that is in communication with the primary water storage tank 58 and a hot water outlet tube 100 for dispensing/outputting hot water from the primary water storage tank 58 and thus the water heater 50. While the hot water outlet tube 100 is shown internal to the housing 15, the hot water outlet tube may be external to the housing 52 with an outlet thereof extending from the housing 52. The hot water tube/outlet is connectable to a hot water supply conduit (not shown) to provide hot water to where it is needed.

The partition 59 has a hole or cutout 60 that is preferably, but not necessarily, situated in the center of the partition 59. A first flue portion or tube 62 extends from the hole 60 to a hole or cutout 65 of the partition 64 to allow hot combustion gas or exhaust 63 from the burning of gas (or other combustible fuel) from the gas burner 56. Situated above the primary water storage tank 58 is a diffuser chamber or hot exhaust gas recovery chamber 66. The top or partition 64 of the primary water storage tank 58 defines/is the bottom or partition of the diffuser chamber 66. The first flue portion 62 allows the combustion gas 63 to flow into the diffuser chamber 66. A diffuser or baffle 70 is situated in the diffuser chamber 66. The diffuser 70 is situated over the outlet of the first flue portion 62 such that the hot combustion gas 63 flows or impinges onto the underside of the diffuser 70 and is redirected to the top 67 of the diffuser chamber 66 to heat the top 67 of the diffuser chamber 66. The diffuser 70 is preferably, but not necessarily, made of metal such that the diffuser 70 is heated by the hot combustion gas 63, as well as radiate acquired heat. Other materials may be used. The diffuser 70 is shown as dome or bell shaped with an air gap about its sides. Other shapes may be used and are contemplated (see FIG. 4). The diffuser 70 is supported on/by legs or supports 71a, 71b, 71c, 71d. The diffuser chamber 66 is also defined by the upper/top wall or partition 67, which also forms/defines a bottom of a second or supplementary water storage tank 72, the nomenclature second being arbitrary. The partition 67 has a hole or cutout 68 that is preferably, but not necessarily, situated in the center of the partition 67. A second flue portion or tube 74 extends from the hole 68 to a hole 77 in a top or partition 76 of the supplementary water storage tank 72. The partition 76 is also a bottom of a second diffuser or hot exhaust gas recovery chamber 78. The supplementary water storage tank 72 is such that the supplementary water storage tank 72 can hold a volume of water.

The second flue portion 74 allows the combustion gas 63a to flow from the first diffuser chamber 66 into the second diffuser chamber 78. A second diffuser or baffle 80 is situated in the second diffuser chamber 78. The second diffuser 80 is situated over the outlet of the second flue portion 74 such that the hot combustion gas 63a flows or impinges onto the underside of the second diffuser 80 and is redirected to a top 79 of the second diffuser chamber 78 to heat the top 79 of the second diffuser chamber 78. The second diffuser 80 is preferably, but not necessarily, made of metal such that the second diffuser 80 is heated by the hot combustion gas 63a, as well as radiating acquired heat. Other materials may be used. The second diffuser 80 is shown as dome or bell shaped with an air gap about its sides. Other shapes may be used and are contemplated (see FIG. 4). The second diffuser 80 is supported on/by second legs or supports 81a, 81b, 81c, 81d. The second diffuser chamber 78 is also defined by the upper/top wall or partition 79, which also forms/defines a bottom of a tertiary or second supplementary water storage tank 84, the nomenclature tertiary and second being arbitrary.

The second supplementary water storage tank 84 has a top 73 that may be the top of the housing 52 such that the second supplementary water storage tank 84 can hold a volume of water. A cold water inlet 89 connected to a cold water supply pipe 88 extends into a lower section of the second supplementary water storage tank 84 for supplying cold water to the second supplementary water storage tank 84. The cold water in the second supplementary water storage tank 84 is warmed or tempered by the hot combustion gas 23a in the second diffuser chamber 78 through radiant heat of the diffuser 70 and the redirection of the hot combustion gas 23a to the bottom 79 of the second supplementary water storage tank 84 in order to create temperate water in the second supplementary water storage tank 84.

The second diffuser chamber 78 is thus configured to temper the cold water in the second supplementary water storage tank 84 to create temperate water. An outlet 91 is provided at a top section of the second supplementary water storage tank 84 that is connected via piping to an outlet 92 at a lower section of the supplementary water storage tank 72 to provide the temperate water from the second supplementary water storage tank 84 to the supplementary water storage tank 72. The diffuser chamber 66 is thus configured to further temper the temperate water supplied from the second supplementary water storage tank 84 in the supplementary water storage tank 72 to create further temperate water.

An outlet 95 is provided at a top section of the supplementary water storage tank 72 that is connected via piping to an outlet 96 situated at a lower section of the primary water storage tank 58 to provide the further temperate water from the supplementary water storage tank 72 to the primary water storage tank 58. The further temperate water is mixed with the hot water of the primary water storage tank 58 and heated. While the temperate water outlet tube is shown external to the housing 52, the temperate water outlet tube may be internal to the housing 52. The water heater 50 also includes a pressure relief valve 87 extending from the housing 52 and in communication with the interior of the primary water storage tank 58 for relieving any excess water pressure within the primary water storage tank 58.

A third flue portion 85 extends from the hoe 82 of the top 79 of the second diffuser 78/bottom 79 of the second supplementary water storage tank 84 to an outlet 75 at the top of the housing 52 to allow hot combustion gas 63b from the second diffuser chamber 78 to be vented from the housing 52/water heater 50. A powered or unpowered vent hood 86 is provided over the flue portion outlet to allow the hot combustion gas/exhaust 63b to escape from the housing 52/water heater 50.

While not shown in the figures, and not necessary for the understanding of the present invention, a sacrificial anode rod may be needed to seal tank imperfections. Further, while not shown in the figures, and not necessary for the understanding of the present invention, a drain for sediment is provided for each water storage tank. Still further, while not shown in the figures, and not necessary for the understanding of the present invention, the diffuser chamber may be double walled to protect insulation, maintain a lower outer skin temperature, and retain and recover additional energy for the hot exhaust gasses.

If further supplementary water storage tanks are provided, further diffuser chambers like the diffuser chambers shown and described herein are provided between further adjacent supplementary water storage tanks. Flue portions in like manner to the flue portions shown and described herein are also provided. Piping with appropriate inlet and outlets are also provided to connect and supply temperate water from the further supplementary water storage tanks to previous adjacent supplementary water storage tanks.

It should be appreciated that the size of the various components of the multi-tank storage type gas water heaters 10 and 50, as well as other embodiments thereof, will be dictated by a desired capacity (e.g., in gallons) of the water heater. By having two or more distinct water tanks incorporated in a single water heater system (housing), more energy can be recovered that would normally be lost as common combustion gas exhaust. Having a second or more tank (supplementary tanks) in addition to the primary tank provides for faster recovery of the hot water in the primary water storage tank as the supplementary water storage tank(s) will not be heating the cold water to the final set temperature of the water in the primary water storage tank. While the present multi-tank storage type gas water heater can be the same total capacity as a traditional gas water heater, the two-tank (or more) system will allow for the total BTU/burner capability to be used on a tank with significantly less volume. This, combined with preheated (tempered or temperate) water allows for a faster recovery and longer sustained supply of hot water. When not in use, all standard gas water heaters maintain water at full temperature in standby mode (when hot water is not dispensed). In the present multi-tank storage type gas water heater, the standby volume of the primary water storage tanka is less than the standard gas water heater-so it takes less energy to maintain the water hot in the primary water storage tank. While in the standby mode, the present multi-tank storage type gas water heater will continue to maintain the full temperature of the primary water storage tank but will also continue to raise the temperature of the water in the supplementary water storage tank(s). This allows for the supplementary or tempering water storage tank(s) to continually raise the water temperature therein and recapture energy that would normally be lost.

It should be further appreciated that there are no limitations on tanks sizes or number of stages (diffuser chambers and supplementary water storage tanks) that may be used for a specific application to achieve more operational efficiency. The present concept is the same for 3, 4, 5 or more tank configurations. Furthermore, the present multi-tank storage type gas water heater may be configured in a horizontal, vertical, or combination thereof for particular applications. Additionally, while the present multi-tank storage type water heater is shown and described as a gas fired water heater, any type of fuel or energy may be used that produces heated exhaust.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention.

What is claimed is:

1. A storage type gas water heater comprising:
    a housing;
    a primary water storage tank within the housing;
    a gas combustion chamber within the housing and situated vertically below the primary water storage tank;
    a gas burner situated in the gas combustion chamber;
    a gas inlet in communication with the gas burner for providing gas to the gas burner;
    a diffuser chamber within the housing and situated vertically above the primary water storage tank;
    a supplementary water storage tank within the housing and situated vertically above the diffuser chamber;
    a cold water inlet in communication with the supplementary water storage tank for supplying cold water to the supplementary water storage tank;
    a single elongated plate-like diffuser situated transverse in the diffuser chamber and vertically above a first flue portion, the first flue portion extending vertically from the gas combustion chamber, through the primary water storage tank and into the diffuser chamber for directing combustion gas from the gas combustion chamber into the diffuser chamber and allowing the combustion gas to impinge on the single elongated plate-like diffuser to heat the single elongated plate-like diffuser and temperate the cold water in the supplementary water storage tank;
    a supplementary water storage tank outlet;
    a primary water storage tank inlet in communication with the supplementary water storage tank outlet for supplying temperate water from the supplementary water storage tank to the primary water storage tank;
    a primary water storage tank outlet extending from the primary water storage tank to outside the housing; and
    a second gas flue portion extending vertically from the diffuser chamber vertically above the single elongated plate-like diffuser, through the supplementary water storage tank and out the housing;
    the gas burner configured to heat the received temperate water from the supplementary water storage tank to a preset temperature via the gas burner situated in the gas combustion chamber for outputting heated water from primary water tank and out the housing via the primary water storage tank outlet.

2. The storage type gas water heater of claim 1, wherein the single elongated plate-like diffuser is suspended in the diffuser chamber via a plurality of legs.

3. The storage type gas water heater of claim 2, wherein the single elongated plate-like diffuser comprises a dome-shaped metal.

4. The storage type gas water heater of claim 2, wherein the single elongated plate-like diffuser comprises a disc-shaped metal.

5. The storage type gas water heater of claim 2, wherein the single elongated plate-like diffuser comprises a dish-shaped metal.

6. The storage type gas water heater of claim 1, further comprising a thermostat attached to an outside of the housing and in communication with the gas inlet for setting a temperature for the water in the primary water storage tank.

7. The storage type gas water heater of claim 1, wherein the gas burner comprises a radial gas burner.

8. The storage type gas water heater of claim 1, wherein the primary water storage tank has an upper surface that is also a lower surface of the diffuser chamber.

9. The storage type gas water heater of claim 8, wherein the diffuser chamber has a top surface that is also a bottom surface of the supplementary water storage tank.

10. A storage type gas water heater comprising:
a housing;
a primary water storage tank within the housing;
a gas combustion chamber within the housing and situated vertically below the primary water storage tank;
a gas burner situated in the gas combustion chamber;
a gas inlet in communication with the gas burner for providing gas to the gas burner;
a plurality of supplementary water storage tanks each within the housing and vertically above the primary water storage tank and vertically above each other;
a first diffuser chamber situated in the housing and vertically above the primary water storage tank and below a first supplementary water storage tank of the plurality of supplementary water storage tanks;
a first single elongated plate-like diffuser situated transverse in the first diffuser chamber;
a first flue portion extending vertically from the gas combustion chamber, through the primary water storage tank and into the first diffuser chamber for directing combustion gas from the gas combustion chamber into the first single elongated plate-like diffuser chamber and allowing the combustion gas to impinge on the first diffuser to heat the first single elongated plate-like diffuser and temperate the cold water in the first supplementary water storage tank;
a supplementary diffuser chamber situated between each vertically adjacent supplementary water storage tank of the plurality of supplementary water tanks above the first supplementary water storage tank;
a supplementary single elongated plate-like diffuser situated transverse in each supplementary diffuser chamber and vertically above a flue portion extending from a vertically lower supplementary water storage tank and into the supplementary diffuser chamber for directing combustion gas from the vertically lower supplementary diffuser chamber and allowing the combustion gas to impinge on the supplementary single elongated plate-like diffuser to heat the supplementary single elongated plate-like diffuser and temperate the cold water in the supplementary water storage tank;
a cold water inlet in communication with a vertically uppermost supplementary water storage tank of the plurality of supplementary water storage tanks for supplying cold water to the vertically uppermost supplementary water storage tank;
each supplementary water storage tank having an outlet in communication with an inlet of a supplementary water storage tank situated vertically adjacent and below the supplementary water storage tank for supplying temperate water thereto; and
an outlet of the lower most supplementary water storage tank to the primary water storage tank for supplying temperate water thereto;
the gas burner configured to heat the received temperate water from the vertically lowermost supplementary water storage tank of the plurality of supplementary water storge tanks to a preset temperature via the gas burner situated in the gas combustion chamber for outputting heated water from primary water tank and out the housing via the primary water storage tank outlet.

11. The storage type gas water heater of claim 10, wherein the gas burner comprises a radial gas burner.

12. The storage type water heater of claim 10, wherein the wherein each single elongated plate-like diffuser comprises one of a dome-shaped metal, a disc-shaped metal, and a dish-shaped metal.

* * * * *